J. F. O'ROURKE.
TUNNEL OR CONDUIT LINING.
APPLICATION FILED FEB. 6, 1912.

1,043,348.

Patented Nov. 5, 1912.

3 SHEETS—SHEET 1.

Witnesses:

Inventor
John F. O'Rourke.
By his Attorney

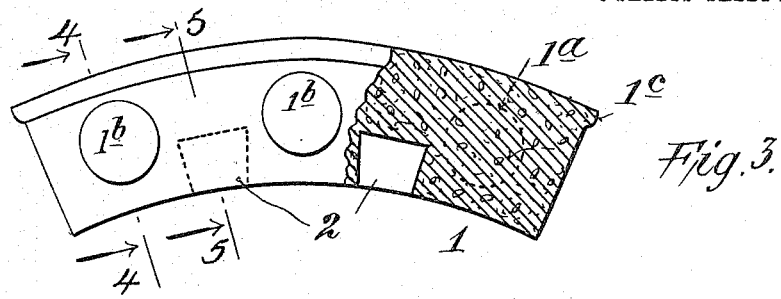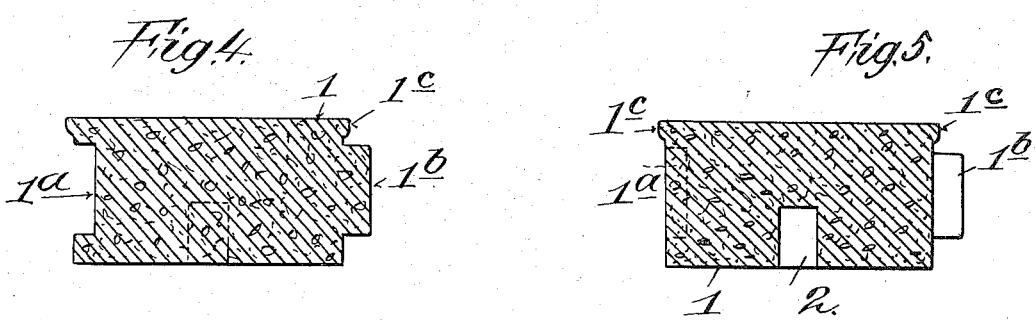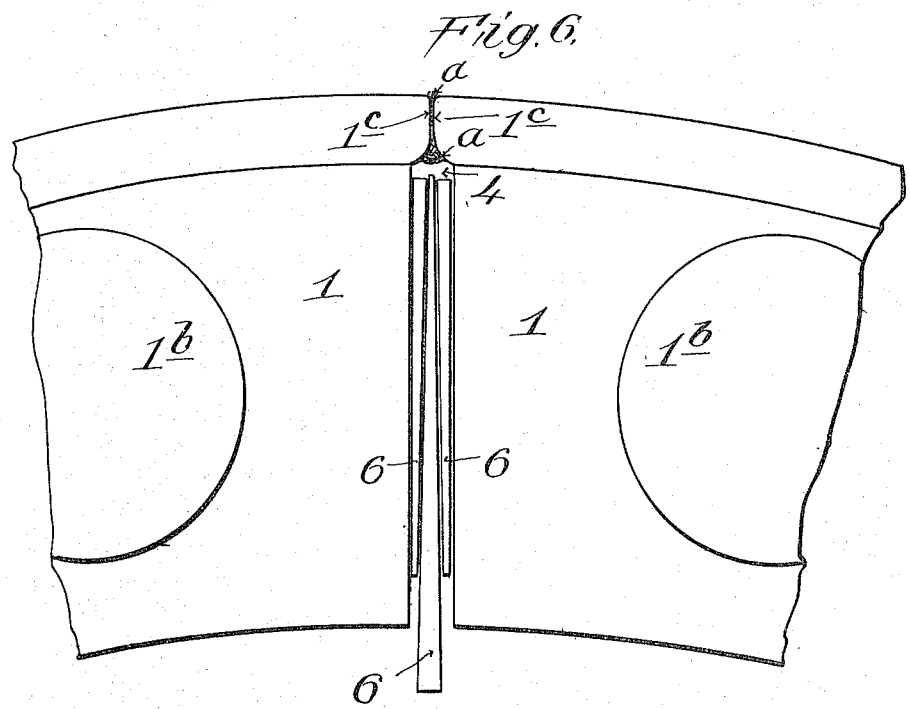

J. F. O'ROURKE.
TUNNEL OR CONDUIT LINING.
APPLICATION FILED FEB. 6, 1912.
1,043,348.
Patented Nov. 5, 1912.
3 SHEETS—SHEET 3.
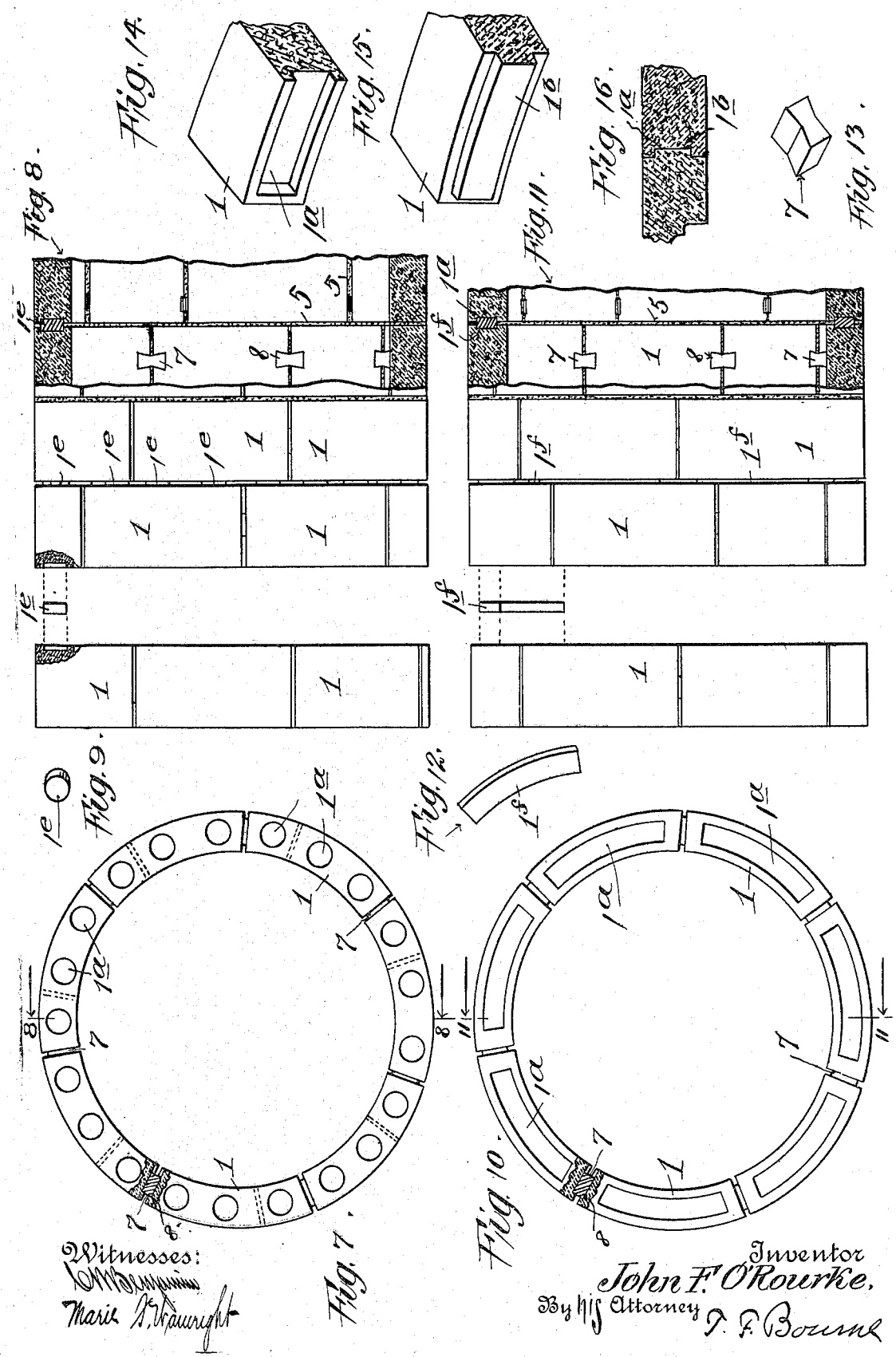
Witnesses:
Inventor
John F. O'Rourke.
By his Attorney
T. F. Bourne

UNITED STATES PATENT OFFICE.

JOHN F. O'ROURKE, OF NEW YORK, N. Y.

TUNNEL OR CONDUIT LINING.

1,043,348.  Specification of Letters Patent.  Patented Nov. 5, 1912.

Application filed February 6, 1912. Serial No. 675,774.

*To all whom it may concern:*

Be it known that I, JOHN F. O'ROURKE, a citizen of the United States, and resident of New York city, borough of Manhattan, in the county of New York and State of New York, have invented certain new and useful Improvements in Tunnel or Conduit Linings, of which the following is a specification.

My invention relates to improvements in linings of tunnels, conduits and the like, and has particular reference to such linings comprising blocks or sections of concrete or the like.

The object of my invention is to provide means for assembling the blocks or sections for a tunnel or conduit lining in such manner as to prevent injury to the adjacent faces or surfaces of alined blocks or sections when pressure is brought to bear against the latter for forcing a shell, shield or the like forwardly through the earth; also to cause the blocks or sections adjacent one another to sustain or brace each other in a lateral direction, and generally to simplify and improve this class of tunnel or conduit linings to the end that the same may be formed into a water-tight unitary structure with expedition and requisite accuracy.

My invention comprises novel details of improvement and combinations of parts that will be more fully hereinafter set forth and then pointed out in the claims.

Figure 1:
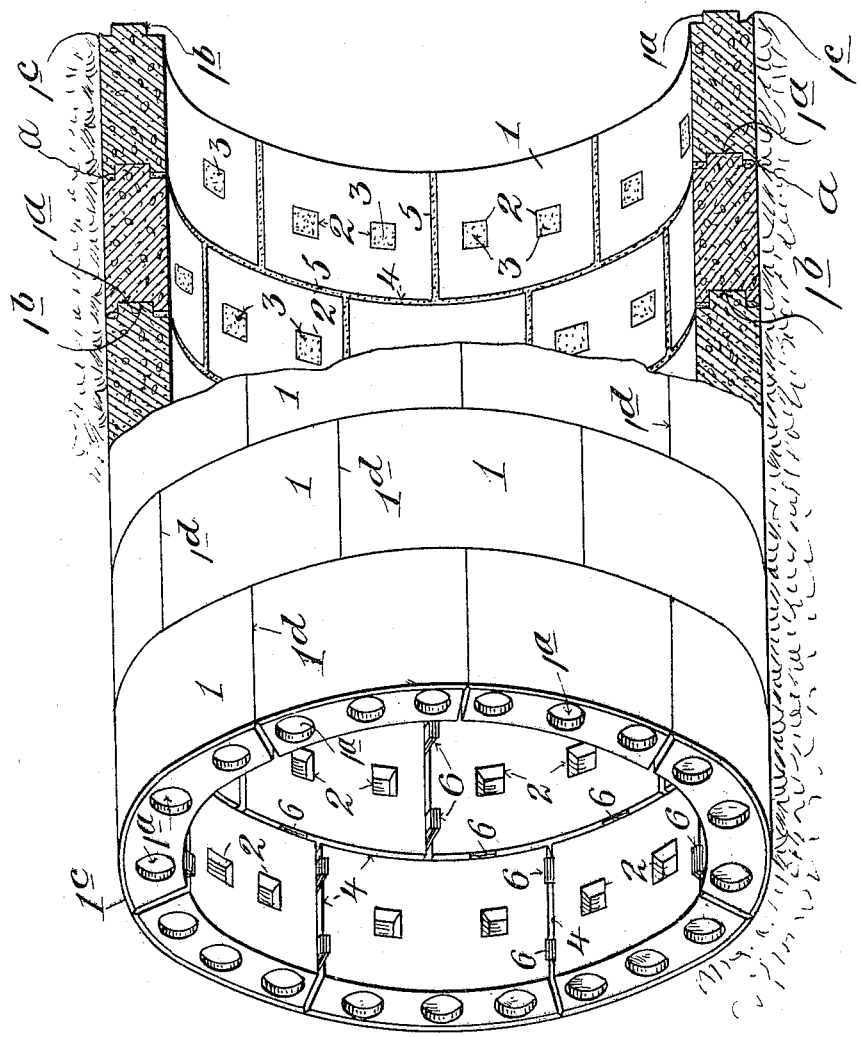
Figure 2:
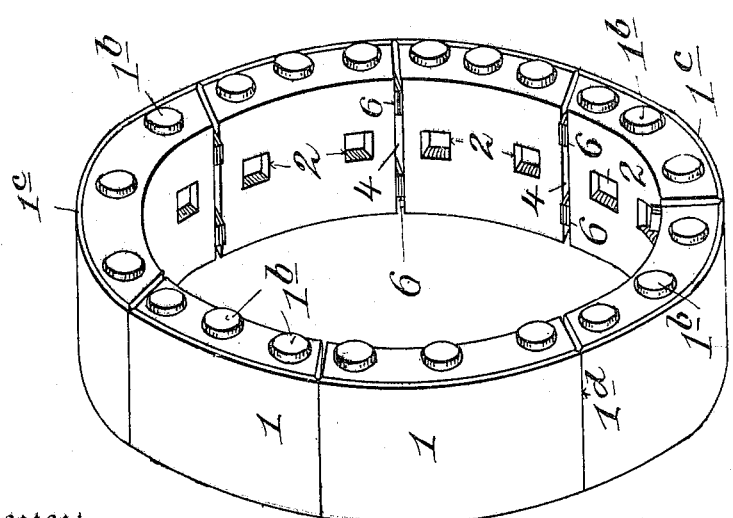

Reference is to be had to the accompanying drawings forming part hereof, wherein, Figure 1 is a partly sectional perspective view of a portion of a tunnel or conduit lining embodying my invention; Fig. 2 is a perspective view of a ring or series of circularly disposed blocks or sections looking from the right-hand end of Fig. 1; Fig. 3 is a partly broken front view of one of the blocks or sections; Fig. 4 is a section on the line 4, 4, in Fig. 3; Fig. 5 is a section on the line 5, 5, in Fig. 3; Fig. 6 is an enlarged detail view of the adjacent ends of two annularly disposed blocks or sections; Fig. 7 is a partly broken front view of the tunnel-lining illustrating a modification; Fig. 8 is a side elevation thereof, partly in section on the line 8, 8, in Fig. 7; Fig. 9 is a detail view of one of the dowels of Figs. 7 and 8; Fig. 10 is a view similar to Fig. 7, illustrating a further modification; Fig. 11 is a side elevation thereof, partly in section on the line 11, 11, in Fig. 10; Fig. 12 is a detail of the dowel of Figs. 10 and 11; Fig. 13 is a detail perspective view of the key between the blocks or sections of Figs. 7 to 11; Fig. 14 is a detail perspective view of part of a block or section of modified construction; Fig. 15 is a view similar to Fig. 14, illustrating the reverse side thereof, and Fig. 16 is a detail section of parts in Figs. 14 and 15.

Similar numerals of reference indicate corresponding parts in the several views.

My improved tunnel lining comprises series of adjacent alined rings, each ring comprising a plurality of suitably shaped or disposed blocks or sections 1 formed or molded of concrete or other analogous material. Blocks or sections 1 are provided on one edge or face with one or more recesses $1^a$ and on the corresponding opposite edge or face with one or more corresponding projections or dowels $1^b$, the projections of one block being adapted to fit into the recesses of an adjacent block, in such manner that such projections will seat firmly against the bottoms of the corresponding recesses to prevent the opposing faces or surfaces of the blocks or sections from being injured by contact one with another, and also to leave spaces for joints to be subsequently filled with mortar or the like. The recesses $1^a$ and the corresponding projections $1^b$ are preferably approximately of the same diameter, allowance being made for sufficient variation to permit of entering the projections into the recesses. The joints $1^d$ between the blocks or sections of one ring break joints with the joints $1^d$ of the blocks or sections of an adjacent ring. The blocks or sections 1 may be provided with inner recesses 2 to facilitate handling and setting, which recesses may be filled with concrete 3 of desired composition, or that similar to the material of the block, or said recesses may be left unfilled in the finished lining, if desired. The outer edges of blocks or sections 1 are shown provided with a bead or molding $1^c$, the bead or molding of one block or section being adapted to come into close relation to the bead or molding $1^c$ of adjacent sections.

In regard to the use of moldings for conduits made in open excavations, it would be more convenient in some cases to have the beads or moldings located at the inner edges of the blocks or sections for the upper part of the conduit, as the subsequent filling of the joints can be more easily accomplished.

On the blocks or sections where the molding shifts from the outer to the inner edge a molding can be provided connecting the ends of such outer and inner moldings whenever desired to continue the molding unbroken.

The blocks may be coated on the moldings $1^c$ with a coating of any suitable waterproof material, such as coal tar pitch, of approved consistency, so that when the blocks or sections are forced into place the excess of the coating on the molding $1^c$ is squeezed away, leaving the joints between the molding filled with such waterproof preparation, as indicated at $a$ (Figs. 1 and 6). Between the opposed faces of the blocks or sections, when the same are being laid, spaces 4 are provided by the contact of the projections with the bottoms of the recesses, the projections being larger than the depth of the recesses. Said spaces 4 may be filled with mortar, grout or the like 5, after the blocks or sections tions 1 have each a plurality of recesses, such blocks or sections may have any desired number of such recesses, such as a single elongated recess $1^a$ as in Figs. 10 and 11. Into such opposed recesses $1^a$, as the blocks or sections are placed in position, correspondingly shaped dowels or plugs $1^f$ may be placed, the dowels or plugs $1^f$ being made of suitable material, such as molded concrete or iron. The dimensions of the dowels or plugs $1^e$ or $1^f$ will be such that when they bear on the bottoms of the corresponding recesses $1^a$, the opposed faces of the blocks or sections will be kept out of contact.

Figs. 14 and 15 illustrate the elongated recess $1^a$ and projection $1^b$ upon the opposite side of the blocks or sections 1, molded with the latter in the manner shown in Figs. 1 to 6, but in elongated and also serving to resist bursting or collapsing of the structure from forces either within or without, because the interlocking projections and recesses retain the blocks or sections from slipping radially or annularly up to the full shearing strength of the projections, and any suitable means may be provided for holding the lining in form if necessary, until the lower half of the spaces between it and the excavation is filled with earth, and a natural settlement of the overlying material in tunnel construction may be depended upon for filling the upper part, and where the conduit is laid in a trench the replacement of the excavated material will inclose the conduit in usual manner.

Having now described my invention what I claim is:—

1. A tunnel or conduit lining comprising segmental blocks or sections having spaced recesses in their side faces, and spaced projections between the blocks or sections and entering said recesses and seating directly against the bottoms of said recesses, the arrangement being such that the projections take the longitudinal thrust whenever such thrust exists.

2. A tunnel or conduit lining comprising blocks or sections having spaced projections and spaced recesses in opposite faces, the projection of one block or section entering the recess of an adjacent block or section the arrangement being such that the projections take the longitudinal thrust whenever such thrust exists.

3. A tunnel or conduit lining comprising segmental blocks or sections having spaced recesses in their side faces, spaced projections between the blocks or sections and entering said recesses and seating against the bottoms of said recesses, spaces being provided between the faces of adjacent blocks or sections, and filling material in said spaces the arrangement being such that the projections take the longitudinal thrust whenever such thrust exists.

4. A tunnel or conduit lining comprising blocks or sections having spaced projections and spaced recesses in opposite faces, the projection of one block or section entering the recess of an adjacent block or section, spaces being provided between the faces of adjacent blocks or sections, and filling material in said spaces the arrangement being such that the projections take the longitudinal thrust whenever such thrust exists.

5. A tunnel or conduit lining comprising blocks or sections having recesses in their side faces, and projections between the blocks or sections and entering said recesses and bearing against the walls of the latter, said blocks or sections having a molding or projection at the outer edges and spaces between the faces of opposed blocks or sections, and filling material in said spaces.

6. A tunnel or conduit lining comprising blocks or sections having projections and recesses in opposite faces, the projection of one block or section entering the recess of an adjacent block or section, said blocks or sections having a molding or projection at the outer edges and spaces between the faces of opposed blocks or sections, and filling material in said spaces.

7. A tunnel or conduit lining comprising alined rings each composed of blocks or sections of concrete having spaced recesses in their side faces, spaced projections between the blocks or sections and entering said recesses and bearing against the walls of the latter, said rings having spaces between the adjacent ends of their blocks or sections, and filling material located in said spaces.

8. A tunnel or conduit lining comprising alined rings each composed of blocks or sections of concrete having spaced projections and spaced recesses in opposite faces, the projection of one block entering a recess in another block, said rings having spaces between the adjacent ends of their blocks or sections, and filling material located in said spaces.

9. A tunnel or conduit lining comprising alined rings each composed of annularly disposed blocks or sections of concrete having spaced projections and spaced recesses in opposite faces, the projection of one block entering a recess in another block, said rings having spaces between the adjacent ends of their blocks or sections, spaces being formed between the blocks of adjacent rings, and filling material in said spaces.

10. A tunnel or conduit lining comprising blocks or sections having recesses in their side faces, projections interposed between the blocks or sections and entering said recesses and bearing against the walls of the latter, wedges interposed between adjacent ends of said blocks or sections maintaining said blocks or sections in set positions, and filling material located in the joints between the blocks.

11. A tunnel or conduit lining comprising alined rings each composed of annularly disposed blocks or sections of concrete having projections and recesses in opposite faces, the projection of one block entering a recess in another block, said rings having spaces between the adjacent ends of their blocks or sections, wedges interposed between adjacent ends of blocks or sections of said rings maintaining said blocks or sections in set positions, and filling material located in said spaces.

12. A tunnel or conduit lining comprising a series of alined rings, each ring having segmental blocks or sections provided with spaced projections and spaced recesses on their side faces, the joints between the blocks or sections of one ring breaking joints with the joints between the blocks or sections of an adjacent ring, the projections of one block or section entering the recesses of the opposite blocks or sections, the arrangement being such that the projections take the longitudinal thrust whenever such thrust exists.

13. A tunnel or conduit lining comprising a series of alined rings, each ring having blocks or sections, the joints between the blocks or sections of one ring breaking joints with the joints between the blocks or sections of an adjacent ring, said blocks or sections having spaced projections on one side and spaced recesses on the opposite side, the projections from a block or section of one ring entering the recesses of two blocks or sections of another ring.

14. A tunnel or conduit lining comprising rings having projections and recesses on opposite sides, said projections entering said recesses and bearing against the material of the rings spacing them apart, said rings having molding at their outer edges, and filling material between the rings.

15. A segmental block for a tunnel or conduit lining having spaced projections and recesses on its side faces the length of the projections being greater than the depth of the recesses.

16. A block for a tunnel or conduit lining having spaced projections and recesses on two opposite faces, and having a molding adjacent an edge.

17. Segmental blocks for tunnel or conduit linings, each comprising a block having recesses and projections on its side faces, the length of the projections being greater than the depth of the recesses whereby when the blocks are assembled the ends of the projections engage the end walls of the recesses and receive the longitudinal thrust whenever such thrust exists.

Signed at New York city, in the county of New York, and State of New York, this 2nd day of February, A. D. 1912.

JOHN F. O'ROURKE.

Witnesses:
T. F. BOURNE,
MARIE F. WAINRIGHT.